United States Patent [19]

Maerkl et al.

[11] Patent Number: 4,531,163

[45] Date of Patent: Jul. 23, 1985

[54] DISC STORAGE ADDRESSING CIRCUIT

[75] Inventors: Michael Maerkl, Dachau; Joseph Matzner, Lochham, both of Fed. Rep. of Germany

[73] Assignee: Siemens Aktiengesellschaft, Berlin & Munich, Fed. Rep. of Germany

[21] Appl. No.: 511,231

[22] Filed: Jul. 6, 1983

[30] Foreign Application Priority Data

Jul. 29, 1982 [DE] Fed. Rep. of Germany ....... 3228359

[51] Int. Cl.³ .............................................. G11B 5/09
[52] U.S. Cl. .................................................... 360/49
[58] Field of Search ........................... 360/49, 39, 72.1

[56] References Cited

U.S. PATENT DOCUMENTS 4,366,511 12/1982 Ranalli ................................... 360/49
4,456,933 6/1984 Schneider et al. .................... 360/49

OTHER PUBLICATIONS

"Unterrichtsblätter der Deutschen Bundespost", (B) edition 26/1973, No. 12, pp. 307 to 314.
Firmen druckschrift, "Siemens System EDS" System Description, 1977.
R. K. Richards, "Arithmetic Operations in Digital Computers", (van Nostrand Comp., Inc., 1958).

Primary Examiner—Vincent P. Canney
Attorney, Agent, or Firm—Hill, Van Santen, Steadman & Simpson

[57] ABSTRACT

A circuit arrangement for addressing a disc storage device in a system for processing data signals, such as a teleprinter and data exchange system, incorporates disc storage devices of two different types, and conversion circuit for automatically converting addresses serving to address storage zones of a disc storage device of a second type (differing from a first type) into relative addresses relating to the desired information block in the first disc storage device, and for converting such relative addresses into absolute addresses which designate the desired information blocks.

6 Claims, 3 Drawing Figures

DISC STORAGE ADDRESSING CIRCUIT

BACKGROUND

1. Field of the Invention

The present invention relates to a circuit arrangement for permitting the addressing of a disc storage device of a first type with addresses which directly address storage zones of a disc storage device of a second type.

2. The Prior Art

Disc storage devices are used in systems which process data signals, such as a teleprinter and data exchange system. In such a system, the disc storage devices serve reliably to store programmed data and information data relative to individual subscriber stations which are connected to the system. The disc storage device is subdivided into a plurality of storage cylinders, each of which has at least one storage track at each disc level.

In the type of data exchange system known as an EDS, circuit arrangement of the type referred to above is employed, using disc storage devices. In the past, only one type of magnetic disc storage device has been used in such a system. (See "Unterrichtsblätter der Deutschen Bundespost" (B) edition 26/1973, No. 12, pages 307 to 314.) When such a system must be extended in storage capacity, it sometimes happens that the type of disc storage device used in the exchange system is no longer available, and must be replaced by a different type of disc storage device. Normally this requires different operating programs in order to read and write data from the programs used with the original disc storage devices. This is because the different types of disc storage devices are frequently of different size, contain different storage formats, and are operated by different forms of addressing. Thus, a relatively high development effort is required in order to use different types of disc storage devices in a single system, or to replace one type of disc storage device with another type.

BRIEF SUMMARY OF THE INVENTION

It is the principal object of the present invention to provide apparatus for allowing the addressing of storage zones of a disc storage device of a second type, using addresses which directly address the storage zones of a disc storage device of a first type.

In accordance with one embodiment of the present invention, a first disc storage device has, in each of its storage tracks, a plurality of equal size sectors in which each sector possesses only part of the storage capacity of a storage track of the second storage device. An address which designates an information block in the second storage device is first converted into a relative address, designating the position of the information block in question within all tracks of the first disc storage device. With the assistance of this relative address, in accordance with the number of sectors in the first disc storage device which form a single storage track, an absolute address is formed which designates the information block in question in the first disc storage device.

The present invention achieves the advantage that only relatively low cost is involved in providing the circuitry for converting the addresses for storage zones and between disc storage devices of two different types, without the need for developing and making available different operating programs for each of the different types of disc storage devices.

The conversion unit of the present invention may be constructed relatively simply and functions to convert the addresses with which it is supplied to corresponding addresses which directly address toward zones and another type of disc storage device.

These and other objects and advantages of the present invention will become manifest by an inspection of the following description and the accompaning drawings.

BRIEF DESCRIPTION OF THE DRAWINGS

Reference will now be made to the accompanied drawings in which.

DESCRIPTION OF THE PREFERRED EMBODIMENT

Figure 1:
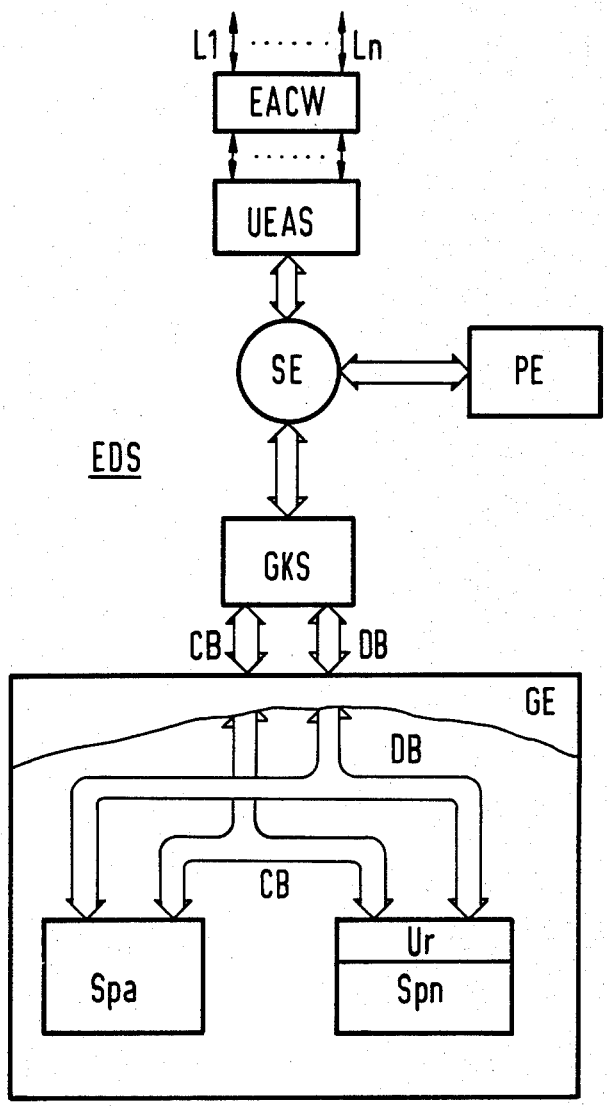
FIG. 1 is a functional block diagram of a teleprinter and exchange system incorporating the present invention.

Referring now to FIG. 1, a functional block diagram of a known teleprinter and data exchange system EDS is illustrated as equipped with the conversion circuit of the present invention. The main components of the EDS consist of a central storage unit SE, a program unit PE connected thereto, a transmission flow control unit UEAS connected between the storage unit SE and an input/output code converter EACW. A device channel control unit GKS is connected between the storage unit SE and a mass storage unit GE.

The central storage unit SE functions to store all of the programs and associated data items which are required for the normal operation of the system. The central storage unit SE also serves to coordinate the functional sequences taking place in the individual processing units. The program control unit PE is responsible for running the programs, and it executes the command of programs which are stored in the storage unit SE.

The transmission flow control unit UEAS represents the actual line connection unit through the input/output code converter EACW to all of the subscriber and connection lines of all the network types connected to the system by means of lines L1 to Ln. Signals are transmitted over such lines in the form of polarity changes or bit groups called envelopes. The transmission flow control unit UEAS forms a central control component of the actual line connection unit and also represents the unit which links the subscriber lines to the storage unit SE. The input/output code converter EACW, which may be provided in multiple numbers if desired, serves to supply the transmission flow control unit UEAS with signals emanating from the subscriber lines L1–Ln together with coded addresses designating the lines in question. The input/output code converter EACW also supplies signals emanating from the transmission flow control unit UEAS to the various lines L1–Ln in accordance with supplied addresses.

The device channel control unit GKS represents the unit which links the storage unit SE to the mass storage unit GE. Programs and data items are stored in the usual manner in the mass storage unit GE, and may be transferred to or from the storage unit SE. All information items required to establish or end the connection are stored in the mass storage unit, as well as information items required for charge metering, statistical analysis, etc.

In the present example, the storage unit SE is connected to the mass storage unit GE by means of two separate bus lines CB and DB, which constitute a control bus line and a data bus line. Each of the bus lines CB and DB comprise a plurality of individual lines.

As shown in FIG. 1, the mass storage unit GE includes two disc stores devices Spa and Spn, both of which are connected to the bus lines CB and DB. The disc storage device Spa consists of an old disc store device, that is one which is already provided in the exchange system. The other storage device Spn, comprises a new disc storage device, which has been added to the exchange system and which is used in addition to, or in place of, the old disc storage device Spa. For example, when the storage capacity of the old disc store Spa is no longer sufficient, additional storage capacity may be provided by adding the new disc storage Spn. The storage device Spn may replace the old storage device Spa in the event that the old disc storage device is no longer functioning correctly.

In order for the new disc storage device Spn to be operated with the same commands and addresses which are provided for operation of the old disc storage device Spa, the new disc storage device Spn has a special conversion circuit arrangement Ur which is connected to both of the bus lines CB and DB in parallel with the old disc storage device Spa.

Figure 2:
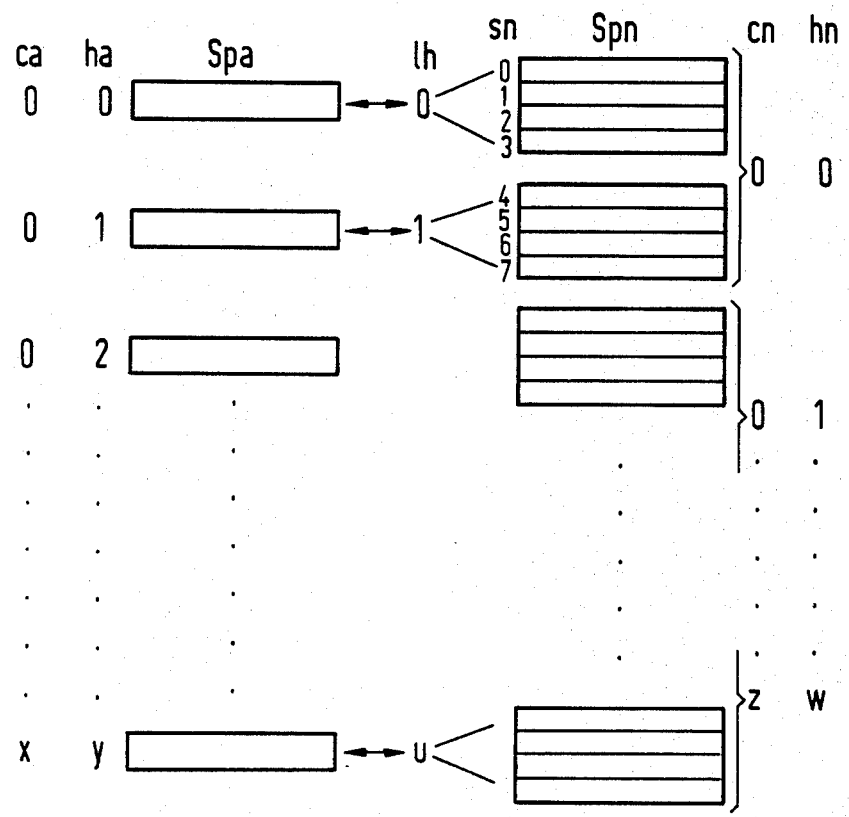
FIG. 2 is a schematic illustration of the organization of two different types of disc storage devices.

FIG. 2 schematically represents the organization of the two disc storage devices Spa and Spn as shown in FIG. 1. Each disc storage device consists of a number of individual discs or storage levels, each of which contains a plurality of storage tracks. A plurality of tracks, including corresponding tracks from each of the discs, makes up a so-called cylinder. Such a cylinder may be understood as an imaginary cylinder which passes through all the individual discs of the disc store devices and includes one storage track of each of the individual discs. Each storage track is divided into a number of sectors which can be of equal length or different lengths.

The organization of the old disc storage device Spa is illustrated on the left hand part of FIG. 2, which shows one stored cylinder. This cylinder is designated by an address ca 0. The storage cylinder ca 0 contains a plurality of tracks which are designated by track addresses ha 0, ha 1, . . . ha y.

The organization of the new disc store device Spn is illustrated on the right-hand part of FIG. 2. In the new disc storage device, each storage track is designated by an address hn, and each track has eight sectors which are designated by sector number sn. Four sectors form a so-called logical storage track which is designated by the address lh. A logical storage track serves to store information corresponding to information accomodated in a storage track in the old disc storage unit Spa. As shown in FIG. 2, the logical storage track with the address lh 0, with sectors designated by sector number 0-3, of the storage cylinder with the address cn 0, and with the storage track address hn 0, is assigned to that storage track of the oldest storage device Spa which is designated by the address ca 0, ha 0. Similarly, the storage track of the old disc storage device Spa which is designated by the address ca 0, ha1, is assigned the logical track with the address lh1 within the address cn 0, hn 0 of the new disc storage device Spn. Here four sectors which bear the sector number sn4-sn7 are assigned to the corresponding storage track ca 0 ha 1 of the old disc storage device Spa. Similarly, the storage track designated by the address ca x, ha y of the old disc storage device Spa is assigned to four sectors in the new disc storage device Spn which form a logical track of the address u and which also form part of the storage cylinder designated by the storage cylinder address cnz and the storage track bearing the storage hnw in the disc storage device Spn.

As shown in FIG. 2, the storage capacity of the sectors in the new disc storage device Spn forming a single logical track, will be such that the storage capacity the sectors will be at least equal to that of the storage track of the old disc storage device Spa.

In one arrangement, the old disc storage device Spa is a magnetic disc storage device having a 203 storage cylinders each with 20 storage tracks, with each storage track having a storage capacity of 7300 bytes. The information blocks stored have a variable length between 23 and 1,500 bytes, that is different block lengths within one tract. Alternatively, if fixed block lengths are used, that is, constant block lengths within a single track, the blocks in question can have lengths between 136 and 3,520 bytes. The new disc storage device Spn has 823 storage cylinders each with five storage tracks. Each sector in the new disc storage device Spn has a storage capacity of 2,048 bytes. This means that the four sectors which form one logical storage track contained in an overall storage capacity of 8,192 bytes, which is sufficient to accomodate this 7,300 bytes which are the maximum stored in a storage track of the old disc storage device Spa.

Figure 3:
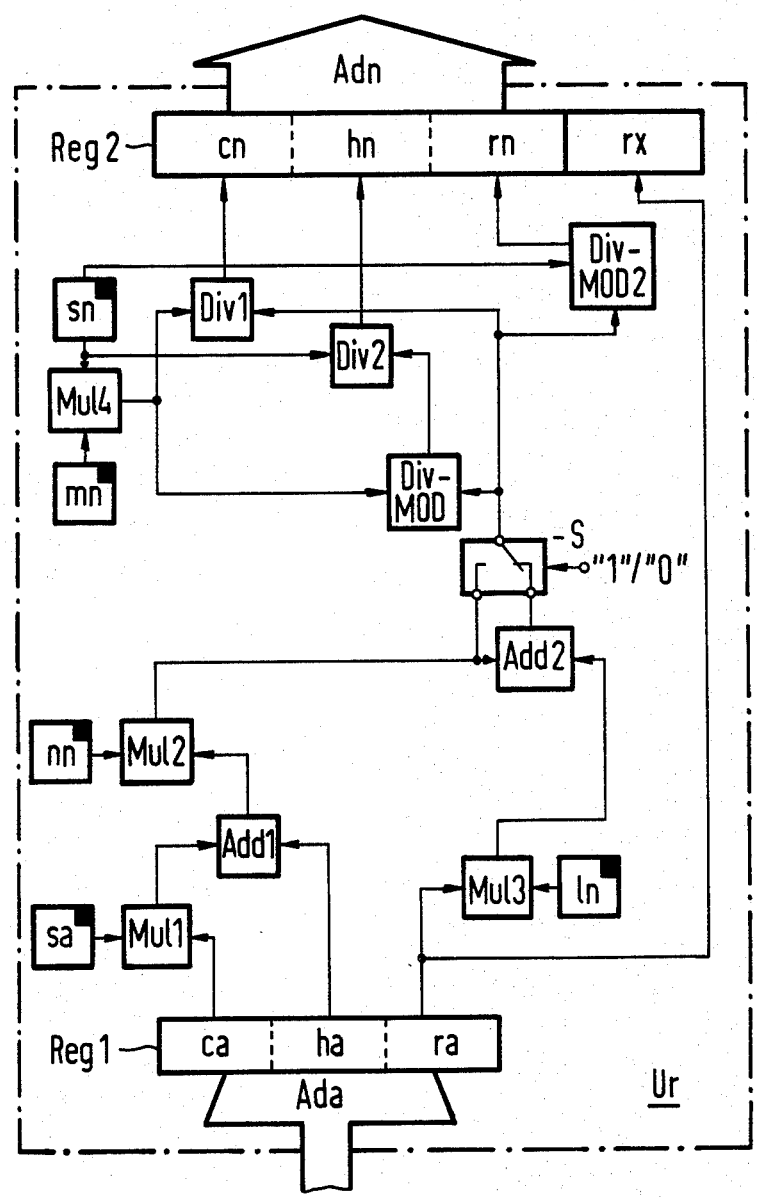
FIG. 3 is a functional block diagram of a conversion circuit employed in the apparatus of FIG. 1, and incorporating an illustrative embodiment of the present invention.

Referring now to FIG. 3, an illustrative embodiment of the conversion circuit Ur is shown. At its input, this conversion circuit Ur is supplied with addresses Ada which serve to directly address storage zones of the old disc storage device Spa shown in FIG. 1. Each such address comprises a storage cylinder address ca, a storage track address ha, and a block number address ra. These addresses components are stored in an address register Reg1. The storage cylinder address ca is supplied to a multiplier Mul 1 where the address is multiplied by a multiplier stored in a storage unit sa representing the number of storage tracks in each storage cylinder of the old disc storage device Spa. The resulting product is added to the storage track address ha in an adder Add1. The sum resulting from this addition is then multiplied in a further multiplier Mul2, with a parameter stored in storage device nn corresponding to the number of sectors forming the logical track in the new disc storage device Spn. The product resulting at the output of the unit Mul2 is a relative address representing the number of the first sector of that logical track in the new disc storage device Spn which contains the information block designated by the address component ca, ha, ra. This signal from the multiplier Mul2 is connected to a switch S and to the input of an adder unit Add 2 described hereinafter.

Assuming the switch S is in its left-hand position, the relative address signal from Mul2 is supplied to the input of a divider unit Div1. The divider unit Div1 is supplied with a divisor from a multiplier unit Mul4. The divisor constitutes the product of a parameter stored in storage unit sn, corresponding to the number of sectors per track in the new disc storage device Spn, and a parameter stored in the storage unit mn, corresponding to the number of tracks per cylinder in the new disc storage device Spn. The output of the divider unit Div1 constitutes an absolute address cn indicating the cylinder number of the first sector of the logical storage track which is being searched for in the new disc storage device Spn.

The output switch S is also supplied to the input of a modulo-divider device Div-Mod, which performs a modulo-division, using as its modulo, rx, the product formed by the multiplier unit Mul4. The result of the modulo-division is supplied to a further divider unit Div2, which receives as a divisor the parameter stored in storage unit sn corresponding to the number of sectors per track in the new disc storage unit Spn. The quotient produced by the divider unit Div2 is an absolute address hn corresponding to the track number of the first sector of the logical storage track being searched for in the new disc storage device Spn.

The output signal from the switch S is also connected to a further modul-divider unit Div-Mod2, which receives its modulo rx from the parameter stored in storage device sn, corresponding to the number of sectors per track in the new disc storage device Spn. Its result comprises the absolute address rn representing the number of the first sector of the logical storage track which is being searched for in the new disc storage device Spn.

The absolute address components cn, hn, and rn, formed by the conversion circuit Ur of FIG. 3, are stored in corresponding register zones of an address register Reg2. The register Reg2 has a further register zone rx which accomodates another address component corresponding to the number of the information block which is required or which is being searched for in the logical storage track. In the event that the old disc storage device Spa stores its information in variable length blocks, this number is the same block number as that contained in the address Ada stored in the storage register Reg1. In this case the address is transferred directly from zone ra of the register Reg1 into the zone rx of the register Reg2.

Alternatively, if the storage tracks in the old disc storage device Spa are divided into fixed block lengths, the switch S is shifted to the right-hand position (as shown). Accordingly the block number component ra is multiplied in a multiplier unit Mul3, using as a multiplier the parameter stored in the storage location ln corresponding to the number of sectors required by blocks of the old disc storage device Spa in the new disc storage device Spn. The product of the multiplication is supplied as an input in the adder unit Add2. As noted above, the other input of the adder unit Add2 is supplied with the relative address from the multiplier unit Mul2 corresponding to the number of the first sector of the desired logical storage track in the new disc storage device Spn. The output signal from the adder unit Add2 is supplied to the right-hand terminal of the switch as, and used to calculate the component cn, hn and rn, as described above. In this case, the address component rx is not relative and can be disregarded.

The register Reg2 contains all of the information required for addressing a block in the new disc storage device Spn and, in the case of variable block lengths, the absolute address of the first sector of the logical track of the new disc storage unit which contains the required block, and the number of the required block within the logical storage track. In the case of fixed block lengths, the register Reg2 contains the number of that sector in the disc storage device Spn which contains the required block.

It is apparent from the above that the conversion unit Ur illustrated in FIG. 3 makes it possible to address the new disc storage device Spn with addresses which directly address the old disc storage device Spa. Thus, by using use of the converter unit, the old disc storage device may be replaced or supplemented with a new disc storage device of a different type.

The unit Ur can also be used if the contents of the disc storage device Spa is to be restored into the disc storage device Spn. In this case, the same address is submitted twice in succession over the data bus line db, with a circuit arrangement Ur operatively connected to the disc storage device Spn. A read operation is first executed for the disc storage unit Spn, which results in reading data from the storage unit Spn into the central storage unit se, after which a right command is executed, with the same address causing this information to be written into the storage device Spa.

It will be apparent that various modifications and additions may be made in the apparatus of the present invention without departing from the central features of novelty thereof, which are intended to be defined and secured by appended claims.

What is claimed is:

1. For use in a system having a disc storage device which processes data signals such as a teleprinter-data exchange system, in which the disc storage device's function is to store items of program data and information data relating to individual subscriber stations connected to such system, the combination comprising; apparatus for producing signals for addressing storage zones of a disc storage device of a first type in response to signals which directly address storage zones of a disc storage device of a second type differing from the first type, each of said disc storage devices being subdivided into a plurality of storage cylinders each having a corresponding storage track on each of a plurality of discs, said first disc storage device having storage tracks which are subdivided into a plurality of equal size sectors, each of said sectors having a storage capacity of only part of the storage capacity of a single storage track of the second disc storage device, means connected to receive said signals which address said second type and responsive thereto for converting an information block which designates an address in the second disc storage device into a relative address designating the position of the information block in question within all of the tracks of said first disc storage device, and means connected to receive said relative address and responsive thereto and to parameters corresponding to the number of storage sectors of said first disc storage device forming a single storage track, for producing signals corresponding to an absolute address designating the addressed information block in said first disc storage device.

2. Apparatus according to claim 1 including a first multiplier connected to receive a first input signal corresponding to the number of that cylinder within the second disc storage unit which contains the desired information block and a second input a signal representative of the number of tracks per cylinder in said second disc storage device, a first adder connected to receive a product-representative signal from the output of said first multiplier and adapted to produce a signal corresponding to the sum of said product, and a signal corresponding to the number of that storage track of the second disc storage device which contains the desired information block, and a second multiplier connected to receive an output signal from said adder as one input and connected to receive as a second input a signal corresponding to the number of sectors of said first disc storage device which form a single logical track having a storage capacity at least equal to the storage track of said second disc storage device.

3. Apparatus according to claim 2 including a further multiplier unit adapted to receive as a first input the signal corresponding to the number of storage tracks per cylinder in said first disc storage device, and as a second input the number of sectors per storage track in said first disc storage device, and a first divider having one input connected to the output of said further multiplier and a second input connected to the output of said second multiplier for producing a signal corresponding to the number of the storage cylinder which contains the desired information block in said first disc storage device.

4. Apparatus according to claim 3, including a modulo-division unit connected to receive the output of said second multiplier, and connected to receive as a modulo input, the output of said further multiplier, and a second divider connected to receive as a second input a signal corresponding to the number of sectors per storage track of said first disc storage device, for producing a signal corresponding to the track number of said first sector of the storage zone containing the addressed information block in said first disc storage unit.

5. Apparatus according to claim 1, including means connected to receive, and responsive to, a signal corresponding to the block number designating the addressed information block in said second disc storage device, for producing a signal corresponding to a block number of said first disc storage device.

6. Apparatus according to claim 1, including means for connecting signals corresponding to the blocks addressed directly to output lines for designating the corresponding blocks in said first disc storage unit, in the event that said second disc storage unit stores variable block lengths.

* * * * *